United States Patent [19]

Greger

[11] Patent Number: 4,637,437
[45] Date of Patent: Jan. 20, 1987

[54] BRAKE FOR A WEAVING MACHINE

[75] Inventor: Wolfgang Greger, Gundetswil, Switzerland

[73] Assignee: Sulzer Brothers Limited, Winterthur, Switzerland

[21] Appl. No.: 650,224

[22] Filed: Sep. 13, 1984

[30] Foreign Application Priority Data

Oct. 6, 1983 [CH] Switzerland .......................... 5440/83

[51] Int. Cl.[4] ...................... D03D 51/00; F16D 51/00
[52] U.S. Cl. .................................... 139/336; 188/77 R
[58] Field of Search ............... 139/336, 1 E, 109, 341; 188/77 R; 267/153; 248/716, 634, 636

[56] References Cited

U.S. PATENT DOCUMENTS

| | | | |
|---|---|---|---|
| 2,571,281 | 10/1951 | Neher | 267/153 |
| 2,790,614 | 4/1957 | Miller | 248/636 |
| 3,144,247 | 8/1964 | Szonn | 267/153 |
| 3,377,036 | 4/1968 | McNatt | 139/109 |
| 3,409,284 | 11/1968 | Rix | 267/153 |
| 3,417,791 | 12/1968 | Gattiker | 139/109 |
| 4,004,794 | 1/1977 | Jarret | 267/153 |
| 4,386,683 | 6/1983 | Schmitz | 188/77 R |
| 4,447,034 | 5/1984 | Gottlob | 248/634 |

FOREIGN PATENT DOCUMENTS 0149641 9/1982 Japan .................................... 248/634

Primary Examiner—Werner H. Schroeder
Assistant Examiner—Joseph S. Machuga
Attorney, Agent, or Firm—Kenyon & Kenyon

[57] ABSTRACT

The brake is provided with a resilient member between the brake band and a brake lever. In addition, the resilient member is provided with recesses in the form of bores in a part of a resilient member subject to compression. The construction of the resilient member is such that the recesses render the resilient member capable of damping high stresses.

8 Claims, 3 Drawing Figures

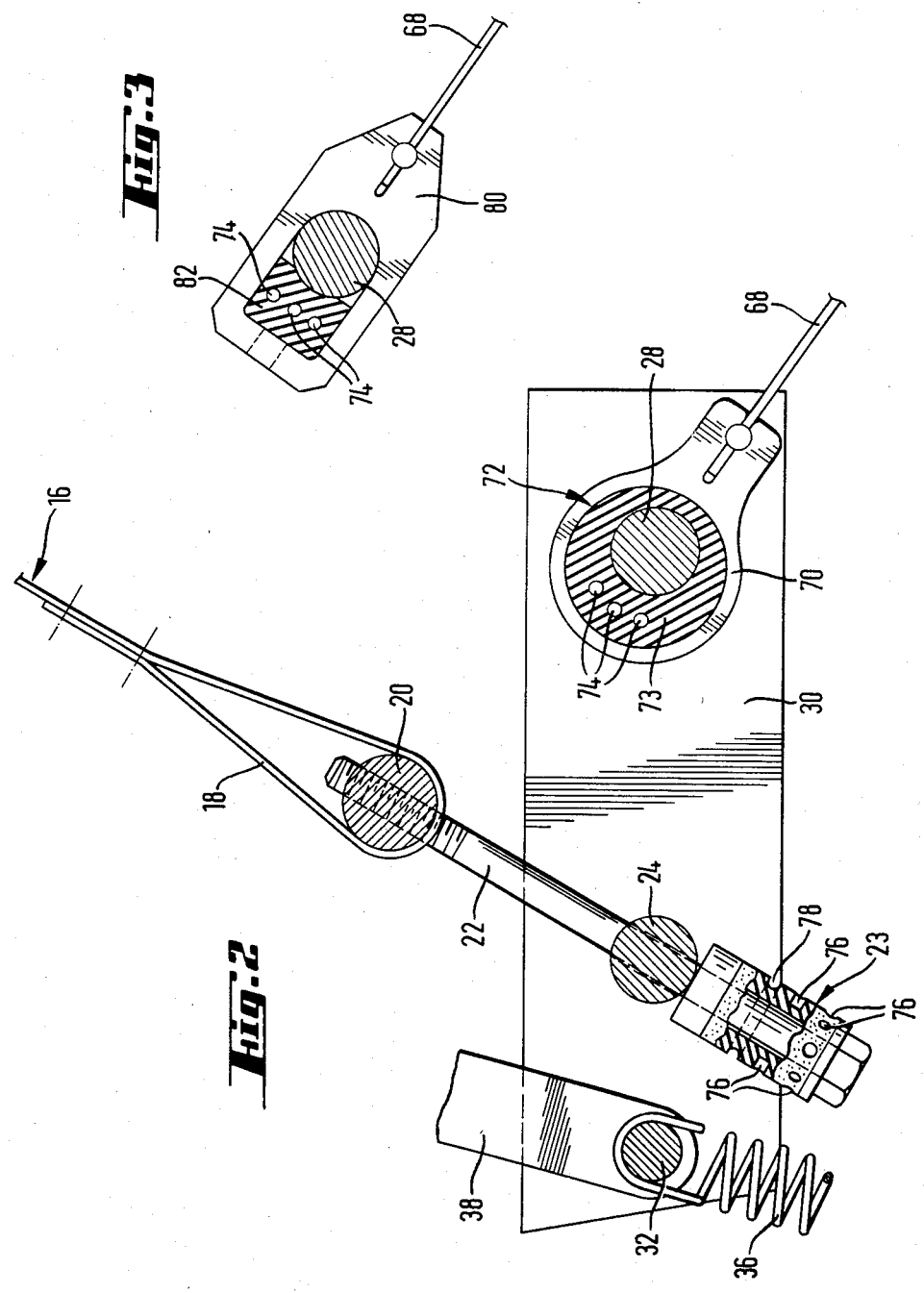

BRAKE FOR A WEAVING MACHINE

This invention relates to a brake for a weaving machine.

As is known, one type of brake which has been used in a weaving machine employs a brake band which is pressable onto a rotating drum by means of a brake lever. In many cases, at least one end of the brake band has been secured to the brake lever by way of a resilient member. Generally, the resilient member has been provided to buffer the forces transferred between the lever and the brake band in order to reduce stressing of the brake band. However, the buffering provided by the known resilient members have proved to be unsatisfactory particularly in the case of very rapid brake applications such as are necessary in the event of a malfunctioning of a high-speed-output weaving machine. for example, should a picking error occur, the main shaft of the weaving machine must stop within a few degrees of rotation. Such a requirement leads to a very heavy stressing of the brake band and drive elements. Clearly, the inertia of the known resilient sleeves is excessive for this kind of rapid motion since the sleeves are generally solid and thus act as a rigid member. Consequently, brake bands frequently break and have to be replaced. Further, the drive elements which are to be braked experience undesirable torsional vibrations.

Accordingly, it is an object of the invention to improve a brake for a weaving machine.

It is another object of the invention to provide an adequate buffering between a brake band and a brake lever in a high speed weaving machine.

It is an object to ensure that the brake band and drive element of a brake for a weaving machine operates reliably and has a long working life.

It is another object of the invention to provide an improved brake for a weaving machine.

Briefly, the invention provides a brake for a weaving machine which is comprised of a rotatable brake drum, a brake band which is disposed peripherally about the drum, at least one pivotal brake lever and a resilient member. In accordance with the invention, the resilient member has a plurality of recesses in a part which is disposed between one end of the brake band an the brake lever for transmitting compression forces therebetween.

The provision of the recesses in the compressed part of the resilient member provides a suprising improvement in the response of the resilient member. This improvement results in ensuring an adequate damping and outstanding reliablility of operation despite very short braking times.

The resilient member may be made of any suitable relatively hard elastomer to ensure a long life.

Very advantageously, the resilient member can be disposed in a sleeve which engages the brake band. This ensures that the brake band is reliabley secured while being used with resilient members of various shapes.

In one embodiment, the resilient member is in the form of a sleeve. In this event, the brake band end can engage directly around the resilient sleeve.

Alternatively, the resilient sleeve can be disposed eccentrically on a pin connected to the brake lever. This ensures a very effective use of the sleeve material. Further, the recesses can be disposed in a relatively thick part of the sleeve to ensure optimum buffering.

Still further, the resilient member may be made of block-like shape. The advantage of this is that the resilient member can be replaced relatively easily as and when required.

The recesses in the resilient member may extend transversely of the brake band length in order to provide for a relatively simple placement of the recesses. Alternatively, the recesses may be groove-like. In this case, this provides a very favorable spring or damping characteristic.

These and other objects and advantages of the invention will become more apparent from the following detailed description taking in conjunction with the accompanying drawings wherein:

FIG. 2 illustrates a partial view taken on line II—II of FIG. 1; and

FIG. 3 illustrates a modified resilient member in accordance with the invention.

Figure 1:
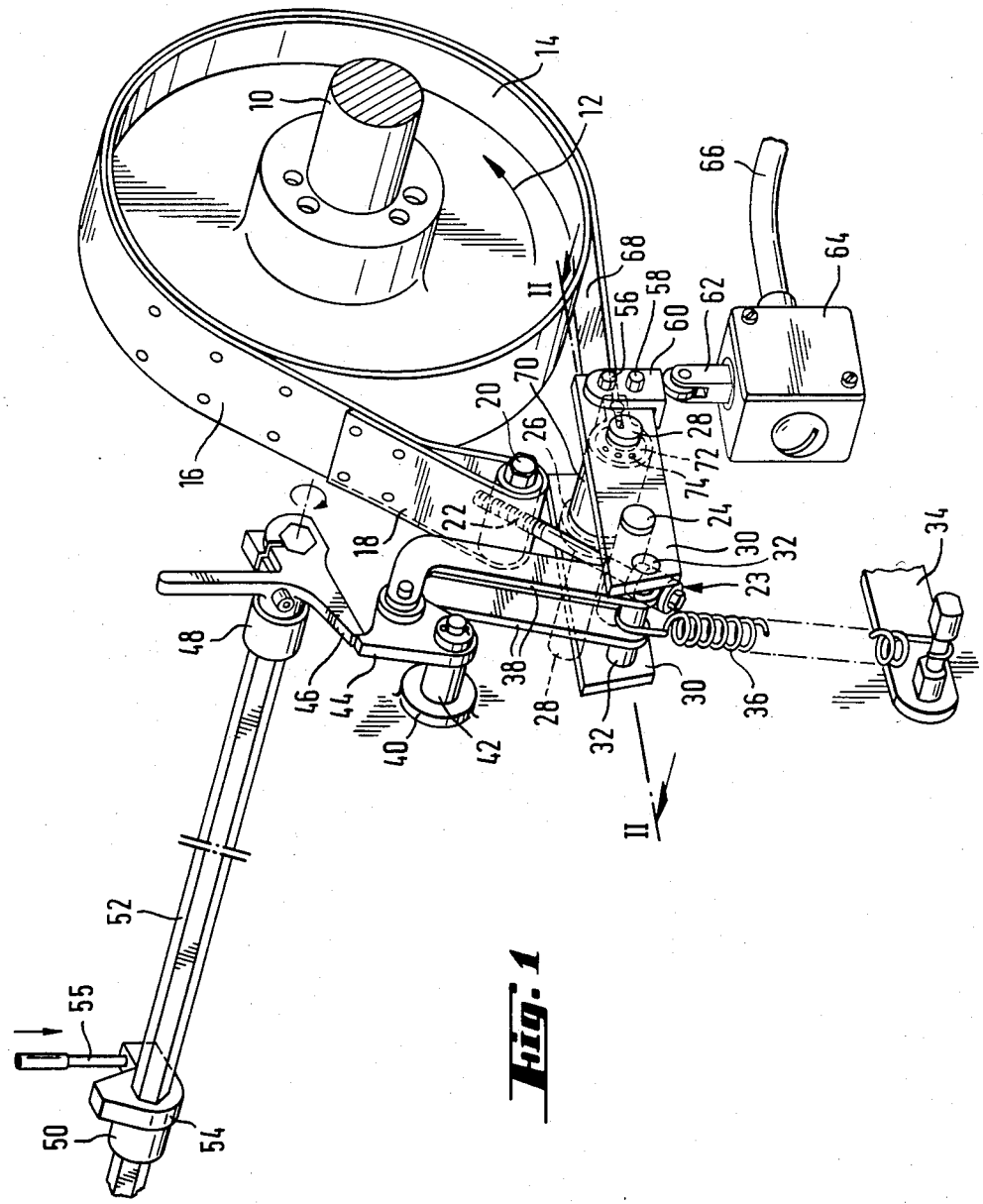
FIG. 1 illustrates a perspective view of a brake constructed in accordance with the invention.

Referring to FIG. 1, the brake is used in a high speed weaving machine having a main shaft 10 which carries a brake drum 14 which rotates in the direction indicated by the arrow 12. As indicated, a brake band 16 is disposed peripherally about the drum 14.

Referring to FIGS. 1 and 2, on end of the brake band 16 has a loop 18 which is connected by way of a pin 20, a stud 22, a sleeve 23 and a pin 24 to a double-walled brake lever 30. As indicated in FIG. 2, the pin 20 is disposed within the loop of the band 16 while the stud 22 is threaded transversely through the pin 20. In addition, the stud 22 passes through the pin 24 and the resilient sleeve 23. The pin 24 is also mounted across the brake lever 30 as indicated in FIG. 1.

The brake lever 30 is pivotally mounted on a spindle 28 which is retained by a bracket 26 (see FIG. 1). In addition, the lever 30 has a pin 32 at one end about which one end of a tension spring 36 is secured with the opposite end of the spring 36 secured to a bracket 34. The pin 32 serves as a pivot for a double-walled link 38 which is connected to an eccentric locking lever 44 secured on a spindle 42 which, in turn, is retained by a bracket 40.

The lever 44 is in engagement with a pawl 46 which co-rotates with a detector shaft 52 mounted in bearings 48, 50 (see FIG. 1). A lever 54 is mounted on the shaft 52 to be actuated by way of a rod 55. For example, should the rod 55 be moved vertically downwardly as indicated in FIG. 1, the lever 54 would rotate in a clockwise direction, as viewed.

Referring to FIG. 1, a shoe 60 is secured by pins 56, 58 to one wall of the lever 30 and cooperates with a cam follower lever 62 of a limit switch 64 which is connected by a line 66 to a main driving motor (not shown) to stop the motor when braking, as is known.

Referring to FIGS. 1 and 2, the second end 68 of the brake band 16 is connected to the spindle 28 by way of an outer sleeve 70 and a resilient member in the form of sleeve 72 within the outer sleeve 70. As indicated in FIG. 2, the outer sleeve 70 is made of a rigid material while the resilient sleeve 72 is eccentrically mounted within the sleeve 70 relative to the spindle 28. In this way, a part 73 of the sleeve 72 which is disposed between the spindle 28 and the sleeve 70 on a side opposite the end 68 ofthe brake band for transmitting compression forces therebetween. Further, the sleeve part 73 is provided with a plurality of recesses in the form apertures 74 having axes parallel to one another.

Referring to FIG. 1, when in operation, as the rod 55 moves downwardly as indicated, the lever 54 rotates the shaft 52 in the direction indicated. This, in turn, causes the pawl 46 to rotate upwardly so that the lever 44 is free to rotate clockwise, as viewed, under the spring biased lever 38. The lever 30 is then pivoted in a counter-clockwise manner, as viewed, about the spindle 28. The stud 22 with the brake band loop 18 is then pulled by the lever 30 and pin 24 to press against the brake drum 14.

Of note, the reislient sleeve 23 may also be provided with recesses, in this case, in the form of radial bores 76 and peripheral grooves 78.

The spring 36 can be constructed to ensure a rapid braking with a relatively short braking distances since the recesses 74, 76, 78 in the respective sleeves 23, 72 ensure excellent damping. More particularly, torsional vibrations of the main shaft 10 or any subsidiary shafts which may be present are reduced very considerably.

Referring to FIG. 3, wherein like reference characters indicate like parts as above, the brake band end 68 may be secured to a rigid sleeve 80 which receives a block-resilient member 82 which is relatively easy to replace. As above, the resilient member 82 is provided with recesses 74.

Of note, the recesses in the resilient member may take the form of closed voids or pores. Also, the recesses can be filled or packed with a material fo a different density from the remainder of the resilient member. The recesses 74 may, for example, have a diameter from about 1/30 to about 1/5 of the diameter of the part 73. The recesses 76, 78, for example, may have a diameter from about 1/5 to 5/6 of the diameter of the sleeve 23.

The invention thus provides a brake for a weaving machine which is able to absorb very heavy stresses while being able to damp various vibrations in the resilient member.

The invention further provides a relatively simple technique for damping out vibrations incurred during the braking of a brake drum to a stop in a high speed weaving machine.

What is claimed is:

1. A brake for a weaving machine comprising
a rotatable brake drum;
a brake band disposed about said drum to selectively brake rotation of said drum;
a brake lever for engaging one end of said brake band; and
a resilient member having a part between said lever and said one end of said brake band for compression forces therebetween, said part having a plurality of parallel apertures therein for damping vibrations in said member during transmission of forces between said band and said lever.

2. A brake for a weaving machine comprising
a rotatable brake drum;
a brake band disposed about said drum to selectively brake rotation of said drum;
a brake lever for engaging one end of said brake band;
a spindle on said lever;
a rigid sleeve secured to said end of said brake band; and
a resilient member disposed within said rigid sleeve between said spindle and said sleeve, said resilient member having a part between said spindle and said sleeve for transmitting compression forces therebetween, said part having means therein for damping vibrations in said chamber during transmission of forces between said band and said lever.

3. A brake as set forth in claim 2 wherein said means includes a plurality of parallel apertures in said part.

4. A brake as set forth in claim 2 wherein said means includes a plurality of radial bores in said part.

5. A brake as set forth in claim 2 wherein said means includes a plurality of peripheral grooves in said part.

6. A brake as set forth in claim 2 wherein said means includes a plurality of closed voids in said part.

7. A brake as set forth in claim 2 wherein said means includes a plurality of recesses filled with material of a different density from the material of said resilient member.

8. A brake as set forth in claim 2 wherein said resilient member is an elastomer sleeve.

* * * * *